Figure 1:
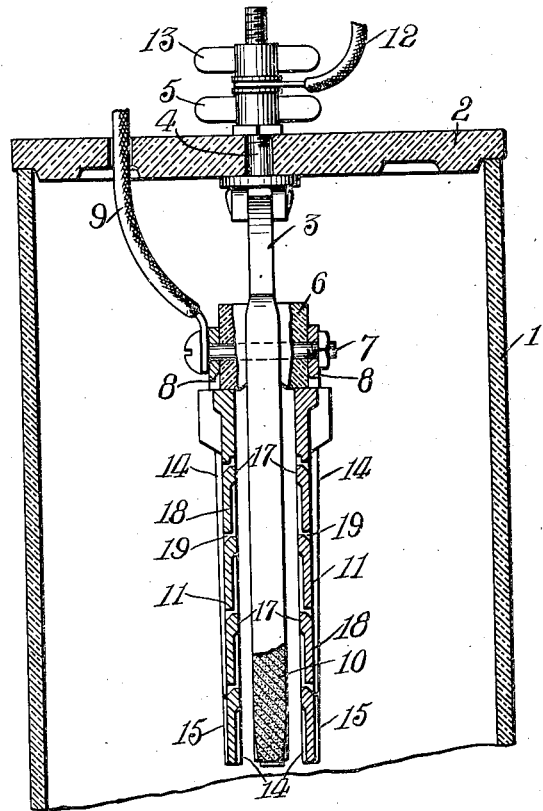

E. McGALL.
PRIMARY BATTERY.
APPLICATION FILED JULY 27, 1914.

1,201,479.

Patented Oct. 17, 1916.

WITNESSES
J. A. Brophy
A. H. Ney

INVENTOR
Edward McGall
BY Dyer & Holden
his ATTORNEYS

UNITED STATES PATENT OFFICE.

EDWARD McGALL, OF ORANGE, NEW JERSEY, ASSIGNOR TO NEW JERSEY PATENT COMPANY, OF WEST ORANGE, NEW JERSEY, A CORPORATION OF NEW JERSEY.

PRIMARY BATTERY.

1,201,479.  Specification of Letters Patent.  Patented Oct. 17, 1916.

Application filed July 27, 1914. Serial No. 853,279.

*To all whom it may concern:*

Be it known that I, EDWARD McGALL, a citizen of the United States, and a resident of Orange, Essex county, New Jersey, have invented certain new and useful Improvements in Primary Batteries, of which the following is a description.

My invention relates generally to improvements in primary or voltaic batteries, and more particularly to that class wherein a caustic alkaline electrolyte is employed and in which the negative electrode consists of an element or elements of oxid of copper or other depolarizing agent, and the positive electrode consists of an element or elements of zinc. It should be stated that by positive electrode I mean the element or elements from which current flows through the electrolyte to the other or negative electrode, from which current flows through the outside circuit, the negative electrode, as I term it, thus constituting the positive pole of the battery.

The principal object of my invention is to provide an improved form of positive element for batteries of this type, whereby the circulation of the electrolyte in the batteries and consequently the diffusion of the particles contained in the electrolyte due to the disintegration of the positive electrode, is increased, and whereby greater efficiency, higher and more uniform voltage, and an increased rate of discharge will be obtained in these batteries without a proportionate increase in the amount of material in the positive elements.

My invention consists further in certain constructional details and combinations of elements, hereinafter more particularly described and claimed, tending to increase the life, efficiency and operation of the batteries.

As may be seen from a visual observation of a battery of the usual construction during discharge thereof, the electrolyte becomes in places surcharged with the soluble secondary products of the reaction, and this accumulation of a more concentrated solution of said secondary products is especially marked in the spaces between the positive and negative elements. Consequently, not only is the internal resistance of the cell increased, but, owing to the deposition of scales and the formation of incrustations on the positive elements, the efficiency of the cell is further reduced and the operation thereof impaired. An increased circulation of the electrolyte with a consequent increased and more rapid diffusion of the secondary products therein being, therefore, highly desirable, I have designed a battery in which at least one of the positive elements, which are preferably in the form of plates, is provided with one or more narrow slits extending nearly or entirely therethrough, which slits preferably extend transversely of the plate and preferably have a sharp downward inclination from the side of the plate nearest to the adjacent negative plate toward the opposite side thereof. In addition, I also preferably provide each of these positive slitted plates, on the side thereof from which the slits incline, with a corresponding number of transversely extending ribs or flanges respectively disposed just below the slits, whereby the plate is formed on one side below each slit with an outstanding lip and with flat panels between the ribs or flanges. The circulation of the electrolyte within a cell provided with one or more of these improved positive elements or plates is greatly improved, as may be readily seen by observing such cell during discharge thereof. The specifically heavier liquid between each of such positive plates and the adjacent negative plate, which liquid is surcharged with the secondary products, accumulates on the adjacent face of the positive plate and flows slowly down the panels formed between the transversely extending ribs thereof, and, being intercepted in its flow down this face of the positive plate by the lips formed by said ribs, passes through the slits into the liquid on the other side of the positive plate, whereby it is more readily distributed and the diffusion of the said secondary products is increased. The heavy streams of the surcharged electrolyte, which are clearly visible in the solution and which formerly appeared mostly in the space between each pair of adjacent negative and positive elements or plates, may now be seen at the side of the positive plate farthest from the negative plate, while the liquid between the plates remains comparatively clear and limpid. In case the cell is provided with one or more of my improved positive plates, the slits of which did not originally extend entirely therethrough, the actions just described are merely delayed until the material at the bottom of the slits is eaten away or dissolved.

For a clearer understanding of my invention, attention is directed to the accompanying drawing forming a part of this specification, and in which:—

Figure 2:
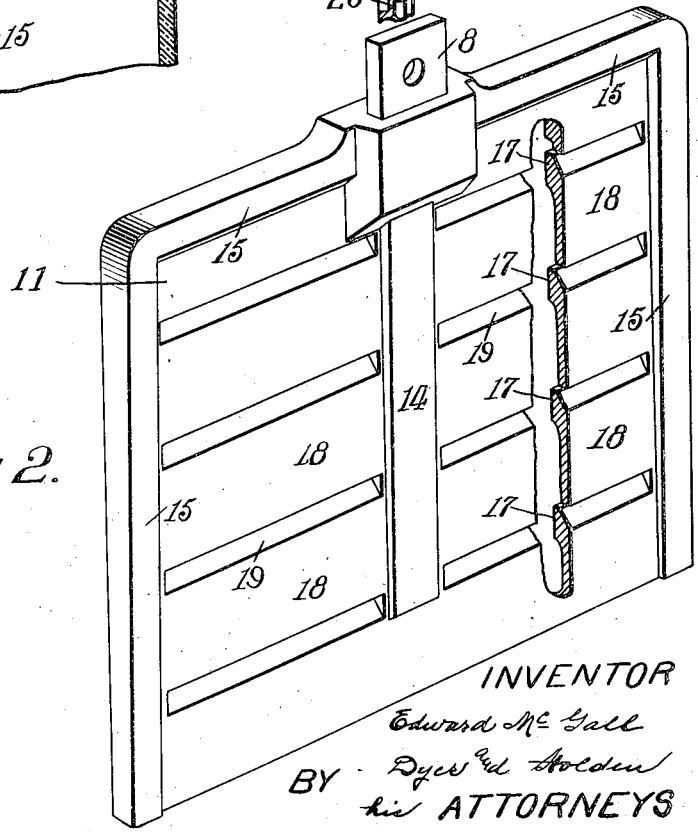

Figure 1 is a central vertical sectional view, partly in elevation, through a primary battery cell provided with my improved positive plates, and at right angles to the positive and negative plates; Fig. 2 is a perspective view, partly broken away, of one of the positive elements or plates shown in Fig. 1; and Fig. 3 is a fragmentary sectional view showing a slight modification of the plate of Fig. 2.

Referring to the drawing, and especially to Figs. 1 and 2 thereof, reference character 1 represents an ordinary battery jar or container preferably of glass or porcelain and provided with the usual cover 2, also preferably of glass or porcelain. Reference character 3 represents a hanger or frame for carrying the negative oxid of copper plate 10, and preferably constructed of a strip or sheet of copper plated with iron or steel. The hanger 3 is preferably in the form of an inverted U, as is usual, and is supported from the cover 2 in any suitable manner, as by a bolt or rod 4 secured thereto and passing through the cover, and a winged nut 5 threaded on the rod. The positive zinc plates 11, 11 are spaced from the negative plate 10 by means of an insulating block 6, the parts being mechanically secured together by means of a bolt 7. The bolt 7 extends through apertured lugs 8 formed in the positive plates 11, 11 and serves to electrically connect these plates. Bolt 7 constitutes one terminal of the battery to which is attached a conductor 9, the other terminal being formed by the rod or bolt 4 to which a conductor 12 is attached between the winged nut 5 and another similar nut 13. Each of the positive plates 11, 11 is provided on either side with a central and vertical reinforcing rib 14 and with integral flanges or ribs 15 at all the edge portions thereof, with the exception of the bottom edge portion. On the side facing the negative plate, each of the positive plates is also provided with a plurality of horizontal ribs 17, extending across the face of the plate and preferably joining the central rib 14 and the ribs or flanges 15, whereby the plate is formed with a plurality of comparatively thin panels 18. The current density at the edge portions of a positive plate, in a battery of the type described herein, is much greater than elsewhere, and the provision of the ribs or flanges as above described prevents the wearing away or consumption of such edge portions in advance of the other portion of the plate and permits the body of the plate to be made much thinner than it would otherwise have to be in order for the plate to be self-supporting and maintain its shape after such body portion has been considerably consumed or worn very thin. Therefore, the life of the plate and consequently that of the cell is increased, and the full amount of the active surface of the plate is maintained throughout the life of the cell. Each of the plates 11 is provided with a plurality of horizontal slits 19, respectively located just above the ribs 17 and extending across the panels 18 but not across the central rib 14. The slits 19 of each plate 11 preferably incline downwardly toward the outer side of the plate.

Figure 3:
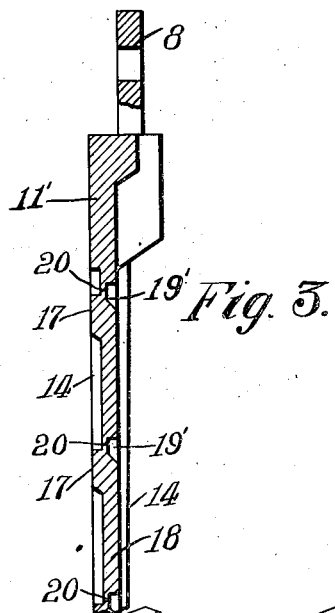

The modified positive plate 11' shown in Fig. 3 differs from plates 11 of Figs. 1 and 2 only in that slits 19' thereof, as the plate is constructed for installation in a cell, extend only part way through the plate instead of entirely therethrough, the plate being formed with webs 20, adjacent that side which should face the negative, forming the bottom of the slits 19'.

The electrolyte (not shown) in the jar 1, in which the zinc positive plates 11 or 11' and oxid of copper negative plate 10 are immersed, preferably consists of sodium hydroxid and water.

While the above description is directed to the preferred embodiments of my invention, I desire it to be distinctly understood that I do not wish to be limited to such embodiments as to shape, dimensions, arrangement or otherwise, but that I may vary and modify the same without departing from the spirit of my invention. For example, I may use my improved positive elements in batteries of the kind described containing a plurality of negative elements, and having the positive and negative elements arranged alternately.

My invention is of especial advantage in batteries in which the negative electrode consists of oxid of copper and the positive electrode of zinc, and wherein a caustic alkaline electrolyte is employed, as in such batteries there is a very pronounced tendency to deposition on the positive elements of the secondary products in the surcharged electrolyte between adjacent positive and negative elements.

By the use of positive elements constructed as described, I have obtained a battery having a greater efficiency and more uniform performance, mainly due to more uniform consumption of the active material and the production of better circulation of the electrolyte with the resultant increased diffusion of the secondary products and reduction of internal resistance.

Having now described my invention, what I claim and desire to protect by Letters Patent is as follows:—

1. In a primary battery, the combination of a negative element and a slitted positive element adjacent thereto and insulated therefrom, said positive element being provided with flanges or ribs adjacent and substantially parallel to the slits respectively, substantially as described.

2. In a voltaic battery, the combination of a negative plate, and a positive plate adjacent thereto and insulated therefrom, one of said plates being provided with one or more horizontally extending slits and with horizontally extending flanges or ribs just below said slits respectively, substantially as described.

3. In a voltaic battery, the combination of a negative plate, and a positive plate adjacent thereto and insulated therefrom, said positive plate being provided with one or more slits inclined downwardly toward the side farthest from the negative plate, substantially as described.

4. In a voltaic battery, the combination of a negative plate, and a positive plate adjacent thereto and insulated therefrom, said positive plate being provided with one or more horizontally extending slits, said slits inclining toward the side farthest away from the negative plate, substantially as described.

5. In a voltaic battery, the combination of a negative plate, and a positive plate adjacent thereto and insulated therefrom, said positive plate having one or more horizontally extending slits and on one side thereof flanges or ribs respectively disposed below said slits, substantially as described.

6. As a new article of manufacture, an electrode plate for primary batteries provided with one or more slits and with means for intercepting the flow of fluid on the exterior of the plate and directing the same to said slits, substantially as described.

7. As a new article of manufacture, a substantially flat electrode plate for primary batteries provided with one or more inclined slits and with means for intercepting the flow of fluid on the exterior of the plate and directing the same to said slits, substantially as described.

8. As a new article of manufacture, an electrode plate for primary batteries, provided with one or more horizontally extending inclined slits extending therethrough and with means for intercepting fluid on the exterior of the plate and causing such fluid to flow through said slits, substantially as described.

9. A positive electrode plate for primary batteries provided with one or more horizontally extending ribs on one side thereof, and one or more inclined slits parallel to and respectively disposed just above said ribs, said slits inclining downwardly toward the other side of the plate, substantially as described.

10. As a new article of manufacture, a positive electrode plate for primary batteries, provided with flanges at the vertical edges thereof, an intermediate flange on each side thereof, horizontal ribs on one side thereof, and horizontal slits respectively in superposition to said ribs and inclining downwardly toward the side opposite to that provided with said horizontal ribs, substantially as described.

11. In a voltaic battery, the combination of a negative plate and a positive plate adjacent thereto and insulated therefrom, one of said plates being provided with one or more slits, said slits inclining downwardly toward the side farthest from the other of said plates, substantially as described.

12. In a voltaic battery, the combination of a negative element and a positive element adjacent thereto and insulated therefrom, one of said elements being provided with one or more slits and with one or more flanges or ribs adjacent and substantially parallel to the said slits respectively, substantially as described.

13. An electrode plate for voltaic batteries provided with one or more ribs or flanges, and with one or more slits parallel to and disposed adjacent said ribs or flanges respectively, substantially as described.

14. An electrode plate for primary batteries provided with flanges at the vertical edges thereof, horizontal ribs, and horizontal slits respectively in superposition to said ribs, substantially as described.

15. An electrode plate for primary batteries provided with flanges at the vertical edges thereof, an intermediate vertical flange, horizontal ribs, and horizontal slits respectively in superposition to said ribs, substantially as described.

16. In a voltaic battery, the combination of a negative plate and a positive plate adjacent thereto, one of said plates being provided with one or more openings, the lower surfaces of said openings inclining downwardly toward the side farthest from the other of said plates, substantially as described.

17. In a voltaic battery, the combination of a negative plate and a positive plate adjacent thereto, said positive plate being provided with one or more openings, the lower surfaces of which are inclined downwardly toward the side farthest from the negative plate, substantially as described.

This specification signed and witnessed this 22nd day of July, 1914.

EDWARD McGALL.

Witnesses:
 WILLIAM A. HARDY,
 FREDERICK BACHMANN.